(12) United States Patent
Poole

(10) Patent No.: US 9,395,457 B2
(45) Date of Patent: Jul. 19, 2016

(54) DEVICE AND METHOD FOR DIRECTIONAL DESIGNATURE OF SEISMIC DATA

(71) Applicant: CGG SERVICES SA, Massy (FR)

(72) Inventor: Gordon Poole, East Grinstead (GB)

(73) Assignee: CGG SERVICES SA, Massy (FR)

( * ) Notice: Subject to any disclaimer, the term of this patent is extended or adjusted under 35 U.S.C. 154(b) by 486 days.

(21) Appl. No.: 13/927,566

(22) Filed: Jun. 26, 2013

(65) Prior Publication Data

US 2014/0043936 A1 Feb. 13, 2014

Related U.S. Application Data

(60) Provisional application No. 61/680,823, filed on Aug. 8, 2012, provisional application No. 61/722,901, filed on Nov. 6, 2012, provisional application No. 61/772,711, filed on Mar. 5, 2013.

(51) Int. Cl.
    *G01V 1/38* (2006.01)
    *G01V 1/36* (2006.01)

(52) U.S. Cl.
    CPC .. *G01V 1/38* (2013.01); *G01V 1/36* (2013.01); *G01V 1/3861* (2013.01); *G01V 2210/24* (2013.01); *G01V 2210/55* (2013.01)

(58) Field of Classification Search
    CPC ......... G01V 1/38; G01V 1/3861; G01V 1/36; G01V 2210/24; G01V 2210/55
    See application file for complete search history.

(56) References Cited

U.S. PATENT DOCUMENTS

| 4,476,550 A | 10/1984 | Ziolkowski et al. |
| 2006/0193204 A1* | 8/2006 | Davies et al. .................. 367/24 |
| 2011/0069581 A1* | 3/2011 | Krohn ............................ 367/43 |

OTHER PUBLICATIONS

C.A. Van Der Schans et al., "Angular-Dependent Signature Deconvolution," SEG conference proceedings, 1983, pp. 433-435.

A. Ziolkowski et al., "The Signature of an Air Gun Array: Computation From Near-field Measurements Including Interactions," Geophysics, vol., 47, No. 10, Oct. 1982, pp. 1413-1421.

* cited by examiner

*Primary Examiner* — Luke Ratcliffe
*Assistant Examiner* — Hovhannes Baghdasaryan
(74) *Attorney, Agent, or Firm* — Patent Portfolio Builders PLLC

(57) ABSTRACT

Computing device, computer instructions and method for directional designature of seismic data d with a given source directivity. The method includes obtaining directional operators r; calculating a model u with a modified source directivity based on (1) seismic data d, and (2) an operator that is a combination of the directional operators r and a reverse transform operator L; using the model u to obtain seismic data $d_{free}$ with modified source directivity; and generating a final image of the subsurface using seismic data $d_{free}$.

20 Claims, 11 Drawing Sheets

DEVICE AND METHOD FOR DIRECTIONAL DESIGNATURE OF SEISMIC DATA

CROSS-REFERENCE TO RELATED APPLICATIONS

The present application claims the benefit of priority under 35 U.S.C. §119(e) to U.S. Provisional Application No. 61/680,823 filed on Aug. 8, 2012, U.S. Provisional Application No. 61/722,901 filed on Nov. 6, 2012, and U.S. Provisional Application No. 61/772,711 filed on Mar. 5, 2013. The entire contents of the above documents are hereby incorporated by reference into the present application.

BACKGROUND

1. Technical Field

Embodiments of the subject matter disclosed herein generally relate to methods and systems and, more particularly, to mechanisms and techniques for directional designature of seismic data collected with one or more streamers.

2. Discussion of the Background

Marine seismic data acquisition and processing generate a profile (image) of the geophysical structure (subsurface) under the seafloor. While this profile does not provide an accurate location for oil and gas, it suggests, to those trained in the field, the presence or absence of oil and/or gas. Thus, improving the resolution of images of the structures under the seafloor is an ongoing process.

During a seismic gathering process, as shown in FIG. 1, a vessel 110 tows plural detectors 112. The plural detectors 112 are disposed along a cable 114. Cable 114 together with its corresponding detectors 112 are sometimes referred to, by those skilled in the art, as a streamer 116. The vessel 110 may tow plural streamers 116 at the same time. The streamers may be disposed horizontally, i.e., lying at a constant depth $z_1$ relative to the surface 118 of the ocean.

Still with reference to FIG. 1, the vessel 110 may tow a sound source 120 configured to generate an acoustic wave 122a (or another type of wave, e.g., electromagnetic). The acoustic wave 122a propagates downward and penetrates the seafloor 124, eventually being reflected by a reflecting structure 126 (reflector R). The reflected acoustic wave 122b propagates upward and is detected by detector 112. For simplicity, FIG. 1 shows only two paths corresponding to the acoustic wave 122a. However, the acoustic wave emitted by the source 120 may be substantially a spherical wave, e.g., it propagates in all directions starting from the source 120.

In other words, parts of the spherical wave propagate directly, see seismic wave 123, to the detector 112. Parts of the reflected acoustic wave 122b (primary) are recorded by the various detectors 112 (the recorded signals are called traces) while parts of the reflected wave 122c pass the detectors 112 and arrive at the water surface 118. Since the interface between the water and air is well approximated as a quasi-perfect reflector (i.e., the water surface acts as a mirror for the acoustic waves), the reflected wave 122c is reflected back toward the detector 112 as shown by wave 122d in FIG. 1. Wave 122d is normally referred to as a ghost wave because this wave is due to a spurious reflection. The ghosts are also recorded by the detector 112, but with a reverse polarity and a time lag relative to the primary wave 122b. The degenerative effect that the ghost arrival has on seismic bandwidth and resolution is known. In essence, interference between primary and ghost arrivals causes notches, or gaps, in the frequency content recorded by the detectors.

The recorded traces may be used to determine the subsurface (i.e., earth structure below surface 124) and to determine the position and presence of reflectors 126. However, the recorded traces include a combination of the desired earth reflectivity and the source signature, or far-field signature. It is desired to remove the far-field signature from the recorded seismic data, a process known as "designature."

Far-field designature is a standard step in the marine processing sequence which converts the source far-field signature to a desired output. The conversion is made by convolving the data by the derived shaping filter. Usually a filter is derived to combine the operations of debubbling and zero-phasing. This approach leaves the source ghost notch in the spectrum of the data and produces a tight zero phase wavelet. The far-field signature is often derived using modeling software (e.g., Nucleus (PGS Seres AS) or Gundalf (Oakwood computing associates Ltd)).

In the quest for broader bandwidth data it is necessary to deghost the data on both the source and receiver sides in order to pursue the true subsurface reflectivity. For conventional data, there is a limited diversity of the receiver ghost notch frequencies which often prevents effective deghosting. For this reason, more sophisticated solutions have been developed which include over-under streamers, variable depth streamers, and utilizing streamers incorporating geophones as well as hydrophones.

On the source side it has also been necessary to move towards ghost removal. For conventional source data, this means shaping the far-field signature to a high bandwidth zero-phase pulse. More recently, broadband sources have become available and they use airguns at more than one depth to diversify the source ghost. Usually, designature is applied as a 1D filter even though the source response is not isotropic. To achieve the correct broadband results for all angles, it is necessary to apply full directional designature where the source signal at all take-off angles is corrected to the same zero phase wavelet.

Although designature is commonly 1 D, to properly compensate for the directivity of the source, directional designature is necessary. This improves resolution and properly preserves AVO. This may be achieved by making a plane wave decomposition of the data in the common receiver domain. This transformation produces a different trace for each source take-off angle which allows the application of angularly dependent filters. Such schemes have been applied in 2D in the tau-p domain and in the f-k domain. However, as the plane wave decomposition is a weighted sum of traces from different shots, this approach is only strictly valid if the directional signatures do not change from shot-to-shot. As a consequence, it is often assumed that the directional signatures remain constant throughout the whole survey.

An existing way of partially solving this problem is to apply 1D shot-by-shot designature in the time-offset domain, followed by a global directional designature in the receiver tau-p domain. However, this approach does not properly correct for shot-to-shot directional designature effects.

Thus, there is a need for a new method that overcomes the above noted deficiencies while at the same time, achieves full shot-by-shot directional designature on a shot-by-shot basis.

SUMMARY

As detailed herein, a method for source directivity compensation of seismic data d with a given source directivity is introduced. The method includes obtaining directional operators r; calculating a model u with a modified source directivity based on (1) seismic data d, and (2) an operator that is a combination of the directional operators r and a reverse transform operator L; using the model u to obtain seismic data $d_{free}$ with modified source directivity; and generating a final image of the subsurface using seismic data $d_{free}$.

According to another exemplary embodiment, there is a computing device for source directivity compensation of seismic data d with a given source directivity, related to a subsurface. The computing device includes a processor configured to, obtain directional operators r; calculate a model u with a modified source directivity based on (1) seismic data d, and (2) an operator that is a combination of the directional operators r and a reverse transform operator L; use the model u to obtain seismic data $d_{free}$ with modified source directivity; and generate a final image of the subsurface using seismic data $d_{free}$.

According to still another exemplary embodiment, there is a non-transitory computer readable medium storing computer executable instructions, wherein the instructions, when executed by a computer, implement the above noted method.

As described herein, the above apparatus and methods may be used to generate improved images of underwater geological structures.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

Figure 1:
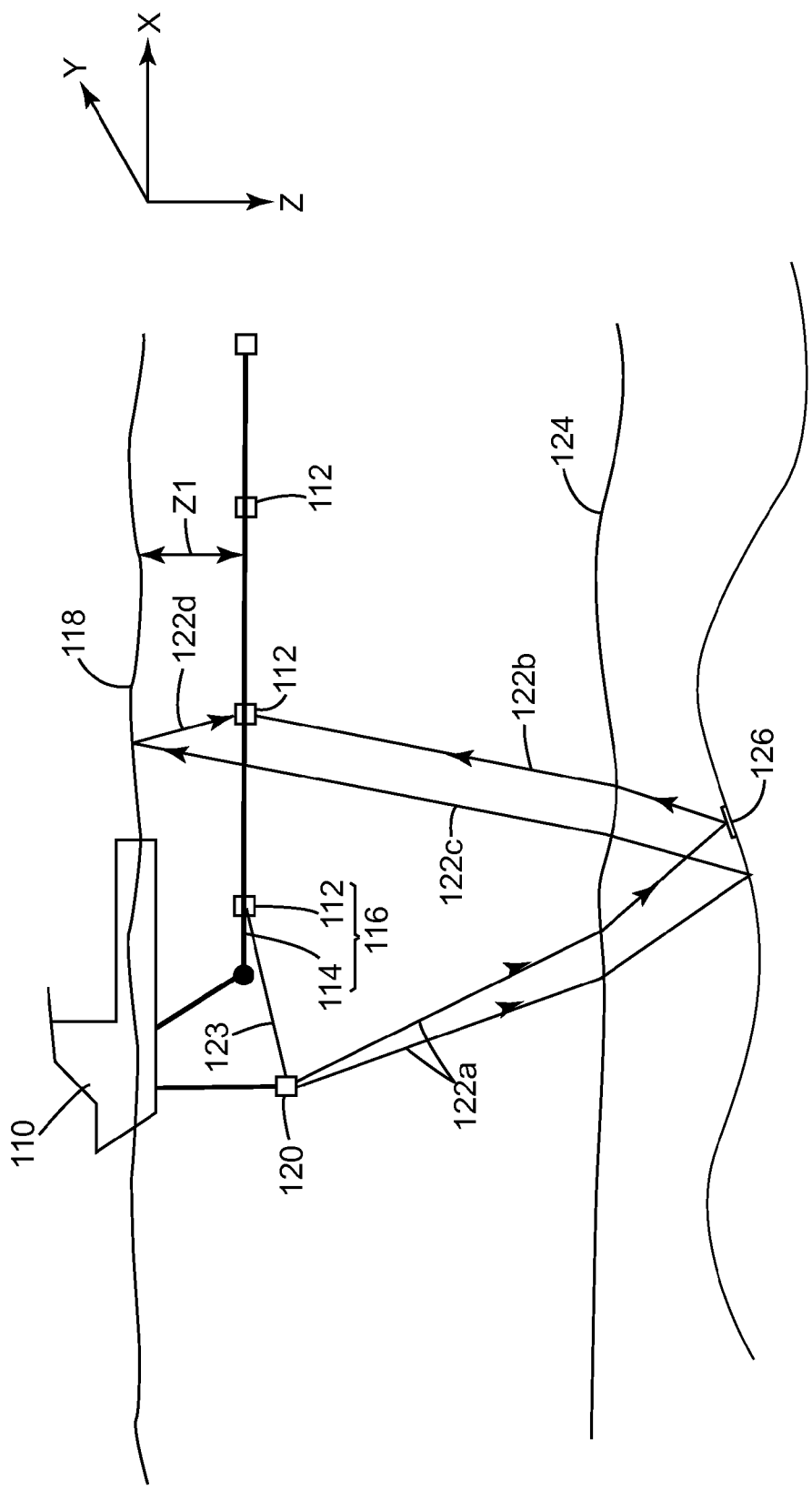
FIG. 1 is a schematic diagram of a conventional seismic data acquisition system having a horizontal streamer.

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to standard least squares linear Radon algorithms for achieving the directional designature of seismic data. However, the embodiments to be discussed next are not limited to such algorithms, but may be also applied in concert with other algorithms.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, a novel method performs designature of seismic data d related to a subsurface that is being surveyed. The method includes obtaining directional far-field signatures of a seismic source that generates the seismic data d; determining directional re-signature operators r for shaping a desired target wavelet to the directional far-field signatures; defining and solving a least squares problem that includes a re-signature operation to derive a tau-p space free of source directivity effects; applying a reverse tau-p transform to the model back to the data domain; and generating a final image of the subsurface using the designatured seismic data $d_{free}$.

In another embodiment, there is a method for source directivity compensation of seismic data d with a given source directivity. The method includes obtaining directional operators r; calculating a model u with a modified source directivity based on (1) seismic data d, and (2) an operator that is a combination of the directional operators r and a reverse transform operator L; using the model u to obtain seismic data $d_{free}$ with modified source directivity; and generating a final image of the subsurface using seismic data $d_{free}$.

The method is now discussed in more detail. For a frequency slice, an operator L links input seismic data D to a model U that includes a number of slowness traces P in the tau-p domain as noted in the equation D=LU (1). D is a Fourier transform of the recorded seismic data d, which is recorded in the time-offset domain. Note that the method may be directly applied to data d in the time domain instead of data D in the frequency domain. Seismic data d is recorded with a given source directivity. Seismic data d may be recorded during a narrow azimuth seismic survey with a source-receiver offset primarily in one direction or during a wide azimuth seismic survey with a source-receiver offset primarily in more than one direction. The seismic data d may be recorded in the time domain or it may be expressed in a frequency domain as data D. Seismic data d may be land data or marine data, e.g., towed streamer data or ocean bottom data, or a combination thereof. If marine data, it may be recorded with seismic receivers located on streamers or ocean bottom nodes. A seismic receiver may be a hydrophone, a geophone, a velocity sensor, an acceleration sensor or a combination thereof. In equation (1), D corresponds to a 2D receiver gather of n shots for one frequency slice. Model U includes m slowness traces $P_i$ in the tau-p domain and L is the reverse slant stack operator. Regarding the tau-p domain, it is noted that this domain is advantageous because seismic data in the time-domain, when transformed in the tau-p domain (intercept time tau and ray parameter p), each p trace corresponds to one distinct direction in which the seismic wave is radiated from the source. Thus, the various take-off angles are not mixed up in these traces. However, other domains may be used, as for example, frequency-wavenumber (f-k) domain, parabolic Radon domain, hyperbolic Radon domain, etc.

Equation (1) can be written in an expanded form as:

$$\begin{pmatrix} D_1 \\ D_2 \\ D_n \end{pmatrix} = \begin{pmatrix} e^{-2\pi i f \tau_{n,m}} & \cdots \\ \vdots & \ddots & \vdots \\ & & \cdots \end{pmatrix} \begin{pmatrix} P_1 \\ P_2 \\ P_3 \\ P_m \end{pmatrix}. \quad (2)$$

The time-shift $\tau_{nm}$ of each matrix element depends on the offset (i.e., the distance between the source and the recording detector) of each trace in meters ($x_n$) and the slowness of the p-trace in seconds-per-meter ($s_m$), $$\tau_{n,m} = x_n s_m. \quad (3)$$

Solving this equation derives a Linear Radon representation of the data, i.e., the model U. For global directional designature, the slowness traces are convolved with designature operators and the resulting traces reverse transformed back to the receiver domain.

However, equations (2) and (3) mix data from different shots and make it impossible to apply shot-by-shot directional designature thereafter.

Thus, to avoid mixing data from different shots, according to an embodiment, the above equations are modified to derive a tau-p representation of the receiver gather that is free of the influences of the source signature such than when a directional operator r and a reverse tau-p transform are applied, a receiver gather is obtained in the offset-time domain.

This operation can be considered as a multiplication in the frequency domain with a shaping operator R, where R is the frequency domain equivalent of directional operators r, to convert a desired sharp zero-phase wavelet to the source signature emitted, for the given shot, at the relevant take-off angle (frequency domain multiplication is equivalent to time domain convolution by the re-shaping operator). The directional operators r may take many shapes. For example, the directional operators r may resemble the far-field signatures, or they may be designature operators, or they may be re-signature operators or they may use notional sources. The directional operators may be derived using modeling or field measurements. Field measurements may include land vibroseis, base-plate measurements, near-field hydrophone or accelerometers data, the seismic data itself, hydrophones or accelerometers placed in or below the water layer, etc. In the following, the concept of re-signature operators is discussed as the other three concepts are known by those skilled in the art. The re-signature operators R can be global g or local l. A local re-signature operator can be expressed as R=l(m,n) where m relates to the take-off slowness, and n relates to the shot number. The linear Radon system of equations (1) is modified as follows $$D = L_l P_d \quad (4)$$

or, if written in an expanded form, $$\begin{pmatrix} D_1 \\ D_2 \\ D_n \end{pmatrix} = \begin{pmatrix} l(1,1)e^{-2\pi i f \tau_{1,1}} & l(1,m)e^{-2\pi i f \tau_{1,m}} \\ l(n,1)e^{-2\pi i f \tau_{n,1}} & l(n,m)e^{-2\pi i f \tau_{n,m}} \end{pmatrix} \begin{pmatrix} P_1 \\ P_2 \\ P_3 \\ P_m \end{pmatrix} \quad (5)$$

with m and n taking different values depending on the position of the operator l in the matrix, i.e., m=1 and n=1 when l is at first row and first column position, m=2, n=1 when l is at first row and second column, etc. $P_d$ is now a tau-p representation of the recorded seismic data, i.e., the model U, free of source directivity effects or with modified source directivity, and $L_l$ is the combination of the slant stack transform L and the re-signature local operator l.

A global re-signature operator can be expressed as $g_m$ (i.e., does not depend on the shot number n) and when used instead the local operator l, equation (5) becomes:

$$\begin{pmatrix} D_1 \\ D_2 \\ D_n \end{pmatrix} = \quad (6)$$

$$\begin{pmatrix} g_1 e^{-2\pi i f \tau_{1,1}} & g_2 e^{-2\pi i f \tau_{1,2}} & g_3 e^{-2\pi i f \tau_{1,3}} & g_m e^{-2\pi i f \tau_{1,m}} \\ g_1 e^{-2\pi i f \tau_{1,m}} & & & g_m e^{-2\pi i f \tau_{n,m}} \end{pmatrix} \begin{pmatrix} P_1 \\ P_2 \\ P_3 \\ P_m \end{pmatrix}.$$

Equations (5) or (6) can be solved (as D and L are known) using least squares inversion (e.g., Cholesky factorization, LU decomposition, conjugate gradients, etc.) to obtain the tau-p transform of seismic data, i.e., the slowness traces P, which represents seismic data after shot-by-shot source designature. Thus, the calculated model U (e.g., slowness traces P) is a tau-p representation of seismic data, free from shot-to-shot directional far-field effects. In a following step, a reverse slant stack operator L can then be applied to model U (slowness traces P) to output the designatured seismic data $D_{free}$ in the offset-frequency domain or $d_{free}$ in the time domain. Thus, the seismic data $d_{free}$ has a modified source directivity relative to original seismic data d after using model U. To modify the source directivity, a model space substantially free of source directivity effects may be used. Further, a step of modifying the source directivity may include shaping the directivity of one source configuration to another source configuration, compensating for shot-to-shot variation in source directivity, and modifying the directivity to a new source depth, or other source directivity. The source may include individual elements located on a horizontal datum or at different datums. Application of a reverse Fourier transform to $D_{free}$ generates the final data in the time domain. While the method described above relates to directional designature on a shot-to-shot basis, it can equally be used for a global shot-to-shot designature. The above noted steps may be extended to 3D receiver gathers, ocean bottom nodes for example. Different model domains can be employed, e.g. frequency-wavenumber domain. The process can be applied to pressure or velocity sensor data.

Figure 2:
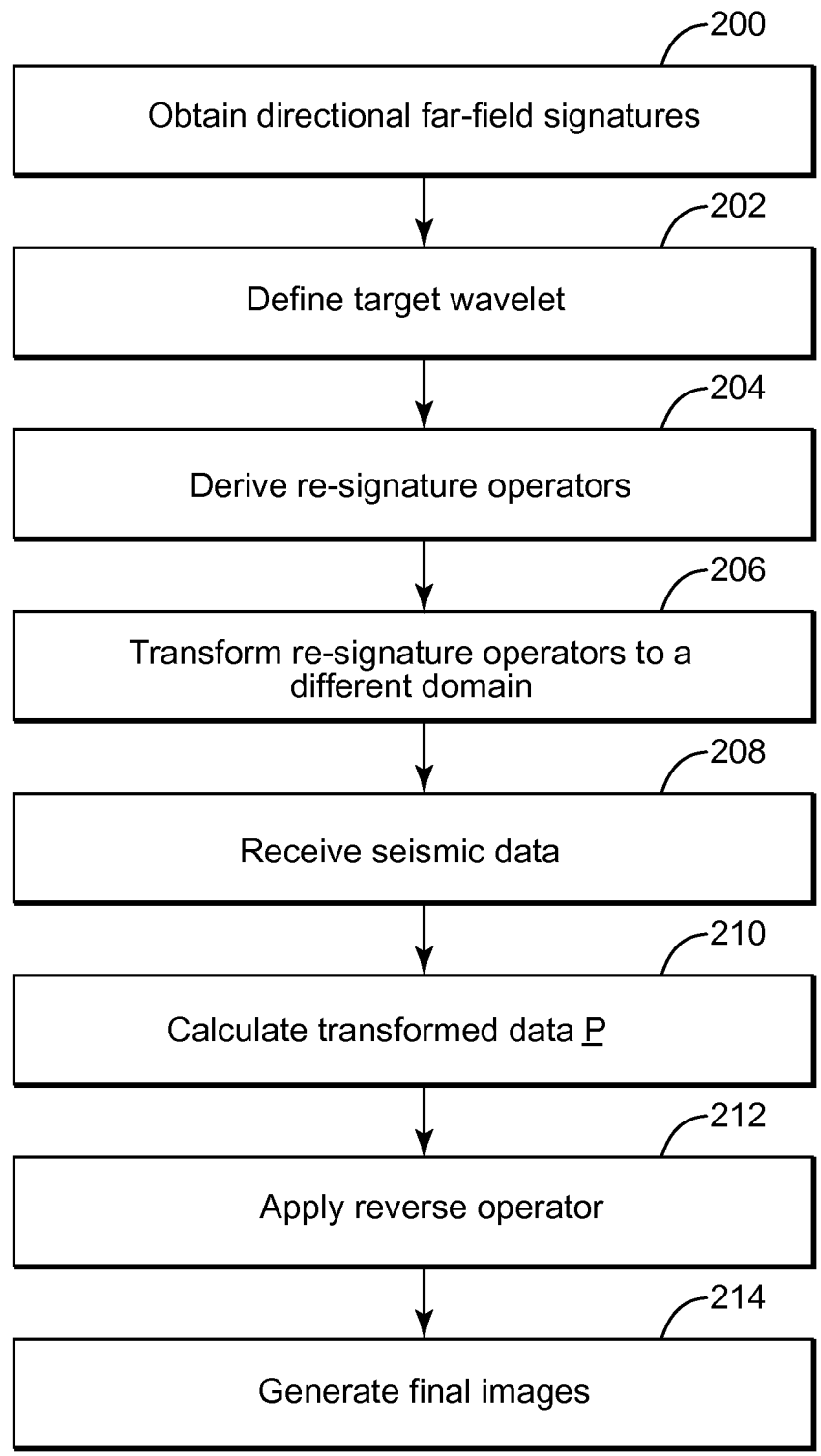
FIG. 2 is a flowchart illustrating a method for calculating directional designature of seismic data according to an embodiment.

The above noted method is now discussed with regard to FIG. 2. FIG. 2 is a flowchart illustrating a method for directional designature of recorded seismic data. In step 200, directional far-field signatures are obtained. The directional far-field signatures are derived on a shot-by-shot basis and they may be calculated, for example, by using a modeling package. In another application, the directional far-field signatures may be obtained by beam-forming the notional sources while including the appropriate directional ghost operator. The far-field signatures may be also derived using nearfield hydrophone data, or from the seismic data d, or from a sensor towed beneath the seismic source, or from a base plate measurement relating to a land dataset.

In step 202, a target wavelet is defined, e.g., a zero phase wavelet with low and high cut responses relating to that used in the streamer recording system. In step 204, re-signature operators (l or g) are derived for each take-off angle. If a local operator is used, the re-signature operators are derived for each take-off angle and for each shot. The re-signature operators r(time, slowness, shot) are derived so that, when applied to the target wavelet selected in step 202, the target wavelet is converted into the directional far-field signatures obtained in step 200. The re-signature operators may restrict the shaping to a decibel limit to avoid over-shaping in the source notch. At the source ghost notch frequencies, destructive interference occurs which can annihilate the emitted source energy. Full shaping at these frequencies can result in division by zero or over amplification of noise which is undesirable. For this reason, it is often desirable to moderate the level of amplification to a decibel limit.

In step 206, the re-signature operators are transformed to another domain, e.g., using a Fourier transform, they are transformed in the time direction in a frequency domain. In other words, the re-signature operators r(time, slowness, shot) in the time domain are transformed in the frequency domain to obtain R(frequency, slowness, shot).

In step 208, the seismic data d(time, shot) recorded by the detectors, and which includes the effects of the far-field signature, is received and sorted into receiver gather domain. The seismic data are transformed into the frequency domain. The receiver gather domain is the preferred choice for directional designature as a tau-p transform decomposes the data into slowness traces relating to different source take-off angles. Other domains may be used, but assumptions would need to be made about the reflecting layers in the subsurface. For example, with a subsurface consisting of purely horizontal layers with isotropic velocity behavior, the approach can be applied in the shot domain. A shot domain implementation may be improved by using ray tracing through a velocity model to link take-off angles at the source with arrival angles at the receiver. Using ray tracing with a derived velocity model, it can be possible to calculate time-variant source take-off angles for any domain. Other possible domains are the common midpoint (CMP) domain, common channel domain, or a pre-stack domain. However, the natural domain for directional designature is the receiver domain.

A receiver gather domain includes those traces recorded by a receiver (detector) at a given location, from multiple sources or from the same source moved at different positions. This seismic data is then transformed to the domain to which the re-signature operators have been transformed, the frequency domain in this embodiment. In other words, a Fourier transform is applied to the seismic data d(time, shot) to arrive at the seismic data in the frequency domain, i.e., D(frequency, shot).

Having transformed seismic data D in the frequency domain and also the re-signature operators R in the frequency domain, the algorithm calculates in step 210 the tau-p transformed data, i.e., slowness traces P that are free of the far-field signature of the source. Note that both the seismic data d and the re-signature operators r may be used in the time domain for calculating the model u. The tau-p transform used to obtain slowness traces P is one possibility. Other appropriate transforms may be used, for example the frequency-wavenumber domain. It could also be possible to use other model domains where the derivative of the function being used would relate to the take-off angle. For example, a parabolic Radon model domain uses the square of the source-receiver offset, the derivative of which would be twice the offset.

Then, in step 212, a reverse slant stack transform L may be applied to slowness traces P to output the data after designature in the offset-time domain, i.e., to obtain data $D_{free}$ and then, a reverse Fourier transform may be applied to arrive to data $d_{free}$ in the time domain. After applying one or more traditional processing steps, a final image of the surveyed subsurface is formed in step 214 based on the designature data $d_{free}$ in the offset-time domain.

Figure 3:
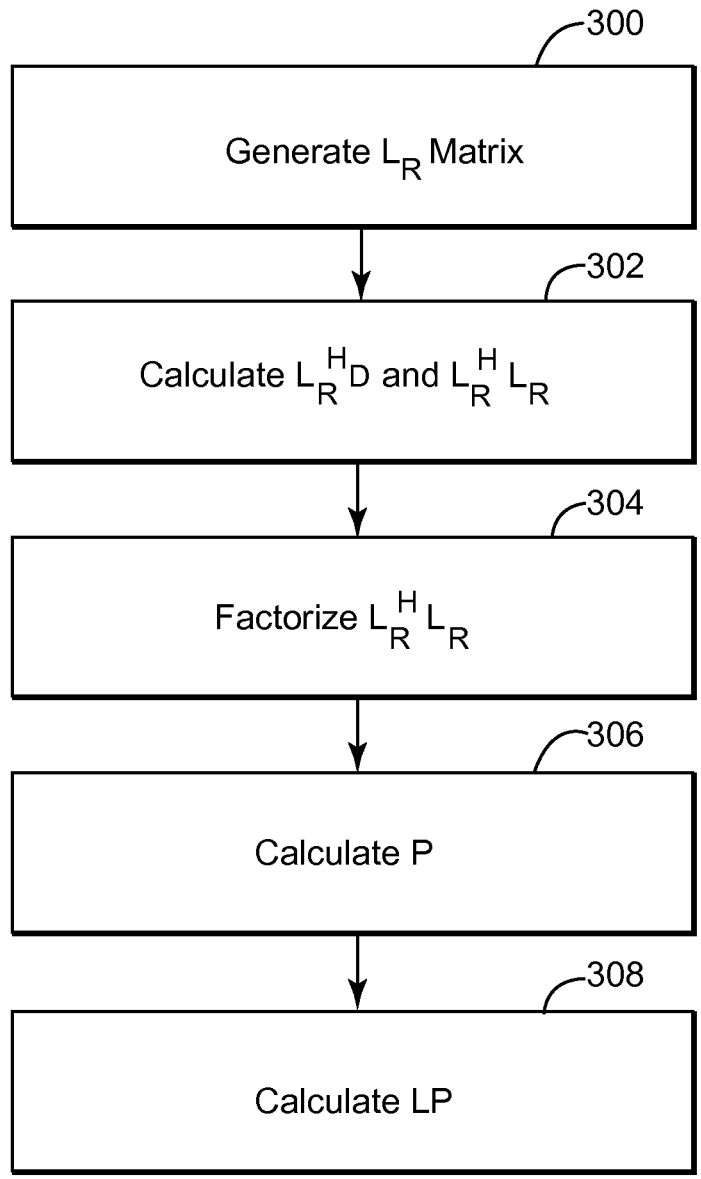
FIG. 3 is a flowchart illustrating a calculation step of the method of FIG. 2 according to an embodiment.

The calculation step 210 is now discussed with regard to FIG. 3. While there are alternative ways to calculate slowness traces P, FIG. 3 illustrates a method that uses Cholesky factorization. More specifically, in step 300, matrix $L_R$ is generated based on the offsets of the traces in the receiver gather and the frequency domain re-signature operators (see equations (3)-(6) and step 206). In step 302, data D and operator $L_R$ are multiplied by operator $L_R^H$, which is the transposed and complex conjugate of $L_R$, to calculate matrices $L_R^H D$ and $L_R^H L_R$. In step 304, a Cholesky factorization is applied to matrix $L_R^H L_R$ and in step 306 the result from step 304 is used with $L_R^H D$ from step 302 to find slowness traces P. In step 308, slowness traces P are pre-multiplied with L to calculate the data $D_{free}$ after directional source designature.

Figure 4:
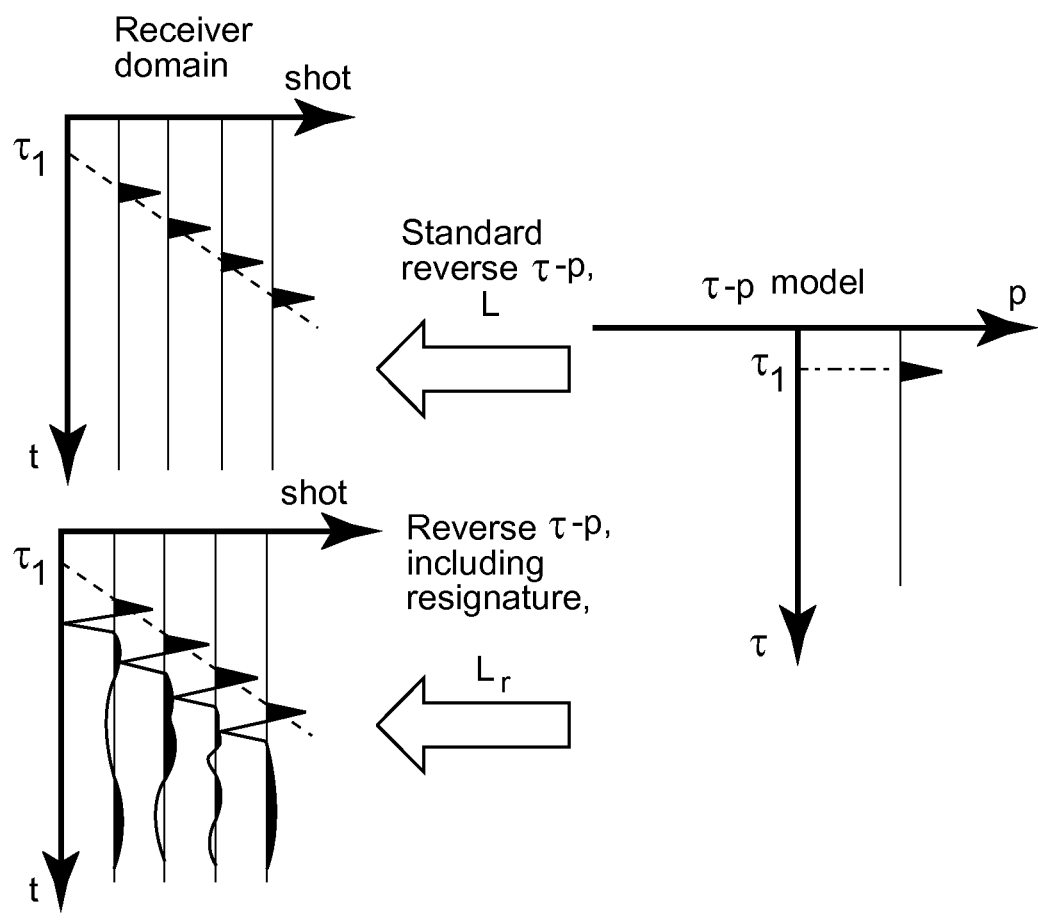
FIG. 4 illustrates differences between a traditional slant stack transform and a novel transform that includes resignature operators according to an embodiment.

To illustrate the differences between the standard L transform and the modified $L_I$ transform that includes the resignature operator, FIG. 4 shows how a standard tau-p transform reverse transforms a spike 400 to a linear event 402 in the receiver domain. With the modified $L_I$ transform, the event (i.e., the spike) is convolved with the resignature operators, which vary from shot-to-shot and slowness.

In one embodiment, instead of performing full designature it is possible to perform shaping. For example, in time lapse processing, there may be a "base dataset" acquired some years ago, and it is desired to compare this old dataset with a monitor dataset recorded recently. The two datasets could use different sources. Instead of applying full designature to both datasets, it may be of interest to shape the source directivity of the monitor dataset to the base dataset so they may be compared to each other.

In still another embodiment, the methods discussed above may be updated to include designature and re-datum. Re-datuming is a known procedure that essentially moves the seismic data from a given depth to a new depth as appropriate for seismic processing.

In one embodiment, the above discussed method may be modified to correct (1) for shooting swath source directivity effects for ocean bottom node (OBN) data and/or (2) to generalize to cover any shooting direction (e.g., spiral shooting for OBN data).

Figure 5:
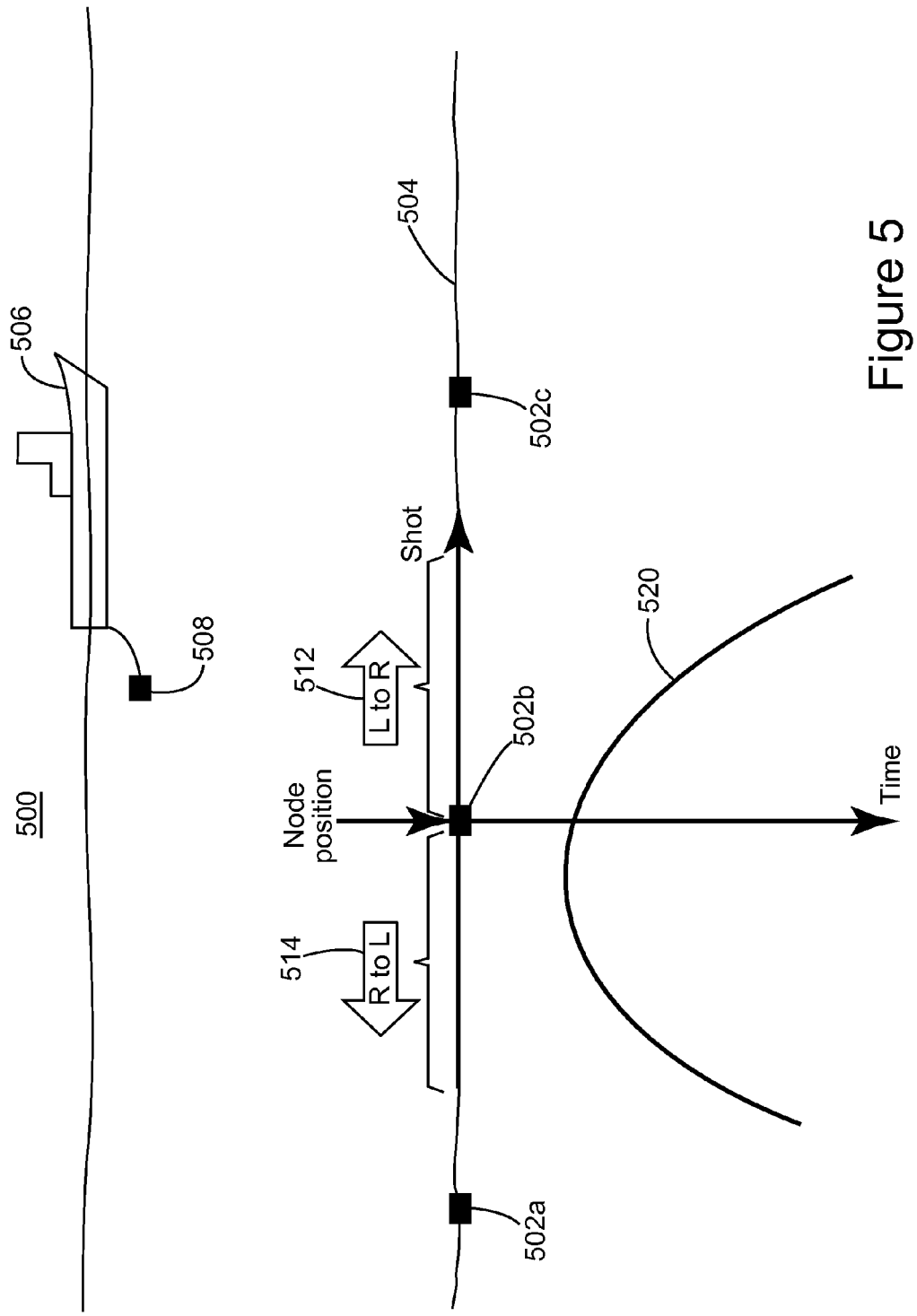
FIG. 5 illustrates a seismic system that uses ocean bottom nodes for recording seismic data.

Regarding the correction for shooting swath source directivity effects, a simplified 2D example is used to illustrate the concept. However, the novel method also applies to 3D situations. As illustrated in FIG. 5, a seismic survey system 500 includes plural OBNs 502a-c distributed on the ocean bottom 504. One or more vessels 506 tow a seismic source 508 and shot the source at given times. If a single node 502b is considered, and a single source line extending along Shot axis, assume that half the source line was shot left-to-right as indicated by arrow 512 and the other half was shot right-to-left as indicated by arrow 514. The recorded seismic data 520, when plotted in time, is also illustrated in FIG. 5.

To solve for the new problem, equation (6) needs to be modified. According to a novel embodiment, the matrix $L_R$ may be split into two parts, corresponding to the left-to-right and right-to-left sections illustrated in FIG. 5. For the left-to-right section, the re-signature operators are left unchanged, while for the right-to-left section the order of the re-signature operators are reversed as illustrated in equation (7):

$$\begin{pmatrix} D_1 \\ D_2 \\ D_n \end{pmatrix} = \qquad (7)$$

$$\begin{pmatrix} g_1 e^{-2\pi i f \tau_{1,1}} & g_1 e^{-2\pi i f \tau_{1,2}} & g_3 e^{-2\pi i f \tau_{1,M-1}} & g_m e^{-2\pi i f \tau_{1,m}} \\ g_m e^{-2\pi i f \tau_{n,1}} & g_{m-1} e^{-2\pi i f \tau_{n,m-1}} & g_2 e^{-2\pi i f \tau_{n,2}} & g_1 e^{-2\pi i f \tau_{n,1}} \end{pmatrix}$$

$$\begin{pmatrix} P_1 \\ P_2 \\ P_3 \\ P_m \end{pmatrix}$$

Except this change, the algorithm presented in FIGS. 2 and 3 need not be altered for calculating the data $d_{\text{free}}$ after directional source designature. Further, equation (7) may easily be extended to 3D to correct for OBN directivity effects.

Figure 6B:
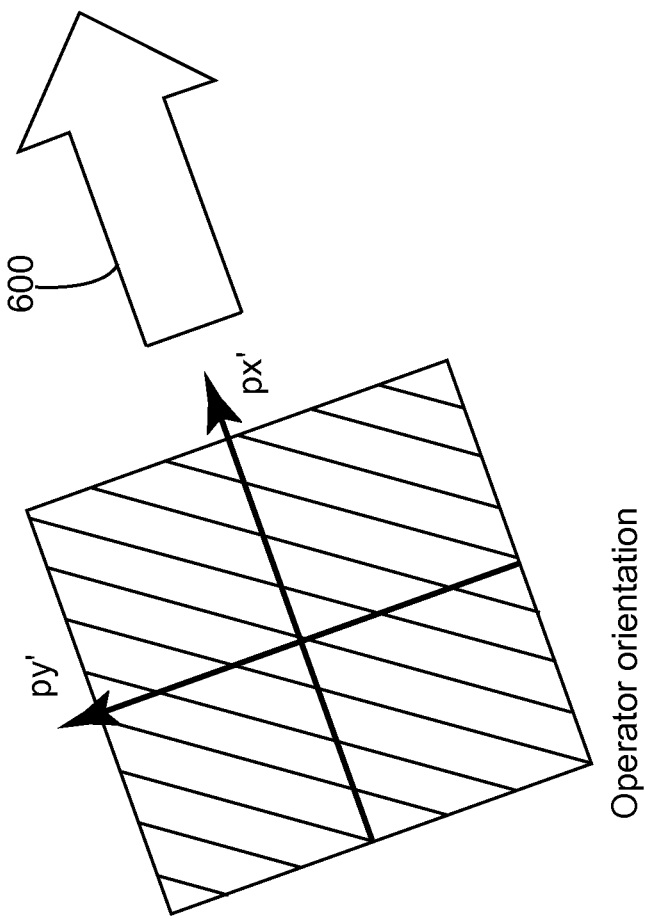
FIGS. 6A-D illustrate a method for calculating directional designature of seismic data for different source orientations.
Figure 6A:
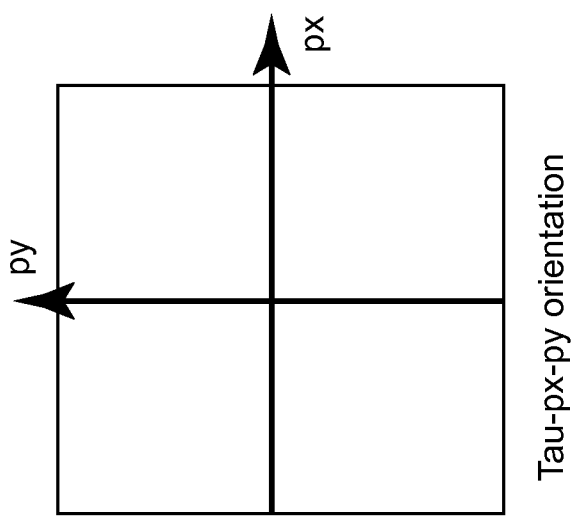

According to another embodiment, the method presented in FIGS. 2 and 3 may be generalized to cover any source orientation (i.e., azimuth). This may be achieved using equation (7) in which a re-orientation operator is introduced into the inversion step. More specifically, FIG. 6A illustrates the slowness on the y axis (py) being along North-South direction, the slowness on the x axis (px) being along the East-West direction and tau (not shown) being perpendicular on the plane made by px and py. FIG. 6B shows a boat 600 traveling at azimuth a relative to due East.

Figure 6C:
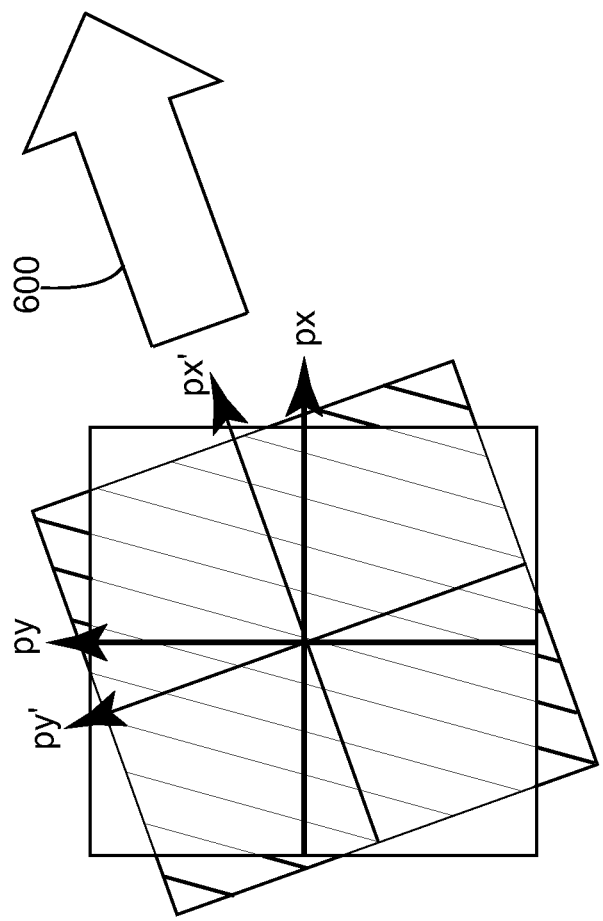
Figure 6D:
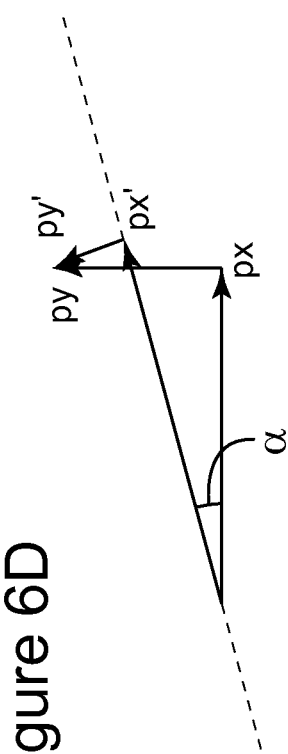

Thus, a mapping needs to be calculated to assign the correct re-signature operators based on the vessel azimuth as illustrated in FIG. 6C. This mapping may be calculated based on the geometry/trigonometry of the vectors px, py, px' and py' as illustrated in FIG. 6D. Note that px' and py' are related to shooting direction orientation while px and py are related to tau-p transform orientation.

One or more of the above methods may be used for wide azimuth 3D processing when far-field signatures are generated at different geographical azimuths as well as different takeoff angles. In addition, re-signature operators for wide azimuth acquisition with coarse offset-y sampling can be derived by making assumptions about wave propagation in the subsurface; for example using ray-tracing.

Figure 7:
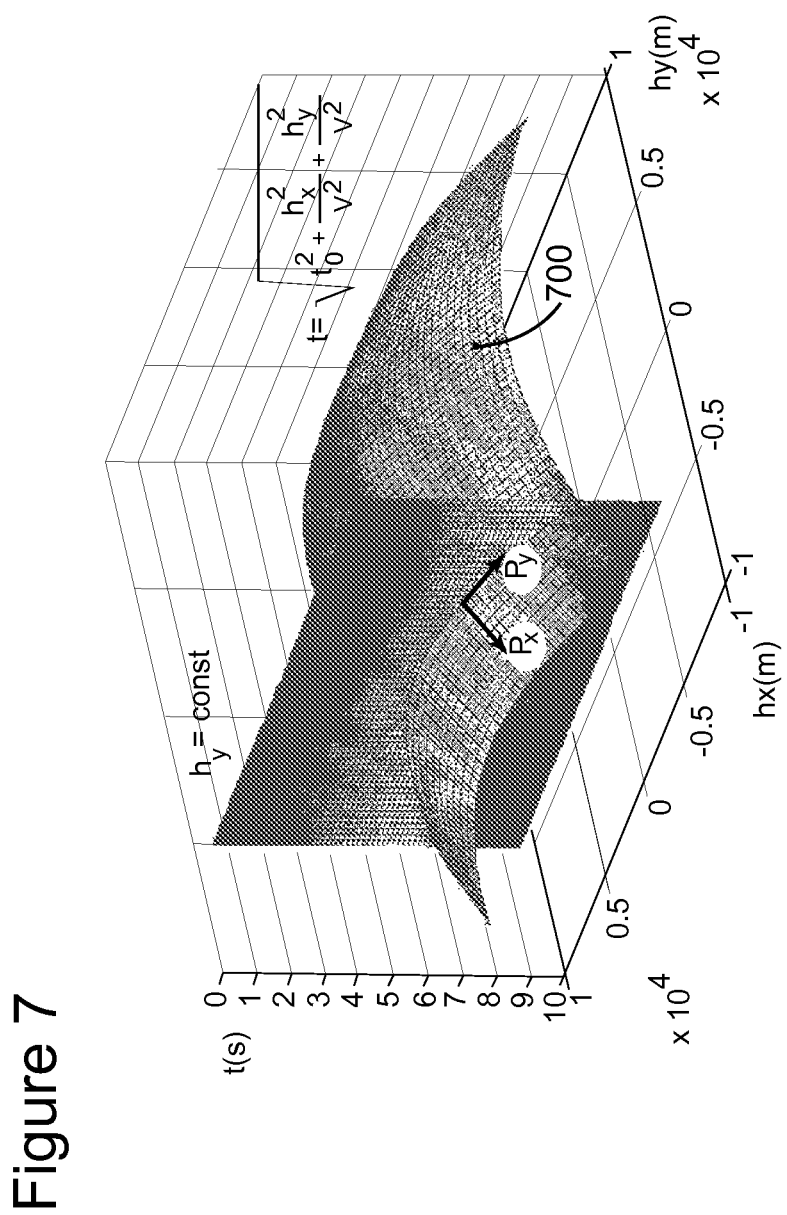
FIG. 7 illustrates a setup for calculating directional designature of wide azimuth acquisition data according to an embodiment.

According to still another embodiment, for a case of wide azimuth acquisition with course y-offset sampling, it is possible to use a targeted approach where slowness in the y-direction ($p_y$) is estimated from slowness in the x-direction ($p_x$). For example, for a target horizon, a hyperboloid surface 700 may be defined by a zero offset time ($t_0$) and offset-y ($h_y$) as illustrated in FIG. 7, which also shows the offset-x ($h_x$). The associated equation is given by:

$$t = \sqrt{t_0^2 + \frac{h_x^2}{v^2} + \frac{h_y^2}{v^2}}, \qquad (8)$$

where V is the RMS velocity associated with the target horizon.

Through differentiation, it is then possible to derive $p_x$ and $p_y$ as follows:

$$p_x = \frac{\partial t}{\partial h_x} \qquad (9)$$
$$= \frac{h_x}{v^2 t},$$

$$p_y = \frac{\partial t}{\partial h_y}$$
$$= \frac{h_y}{v^2 t}.$$

Then, using the association relation:

$$\frac{p_x}{p_y} = \frac{h_x}{h_y} \qquad (10)$$

it is possible to correlate px and py by substituting equations (8) and (9) in equation (10) as follows:

$$p_y = \frac{h_y}{v^2} \sqrt{\frac{1 - v^2 p_x^2}{t_0^2 + \frac{h_y^2}{v^2}}}. \qquad (11)$$

This means that when selecting designature operators for wide azimuth data, instead of selecting operators with $p_y = 0$ it may be beneficial to vary $p_y$ for each $p_x$ operator based on equation (11).

A more general approach may be implemented in which the hyperboloid 700 may vary as a function of time. This implementation may be achieved by either (1) applying the targeted approach illustrated in FIG. 7 and described by equation (11) for different $t_0$ and $V_{RMS}$ (based on a relevant velocity function) and then merging the results together in time windows, or (2) by using a time domain algorithm which implicitly allows variation of $p_y$ with tau and time as well as $p_x$. The hyperbolic moveout equation (8) relates to a horizontal earth with known velocity function. Where it is necessary to account for more complex travel paths, ray tracing can be used to derive travel times and slowness.

Figure 8:
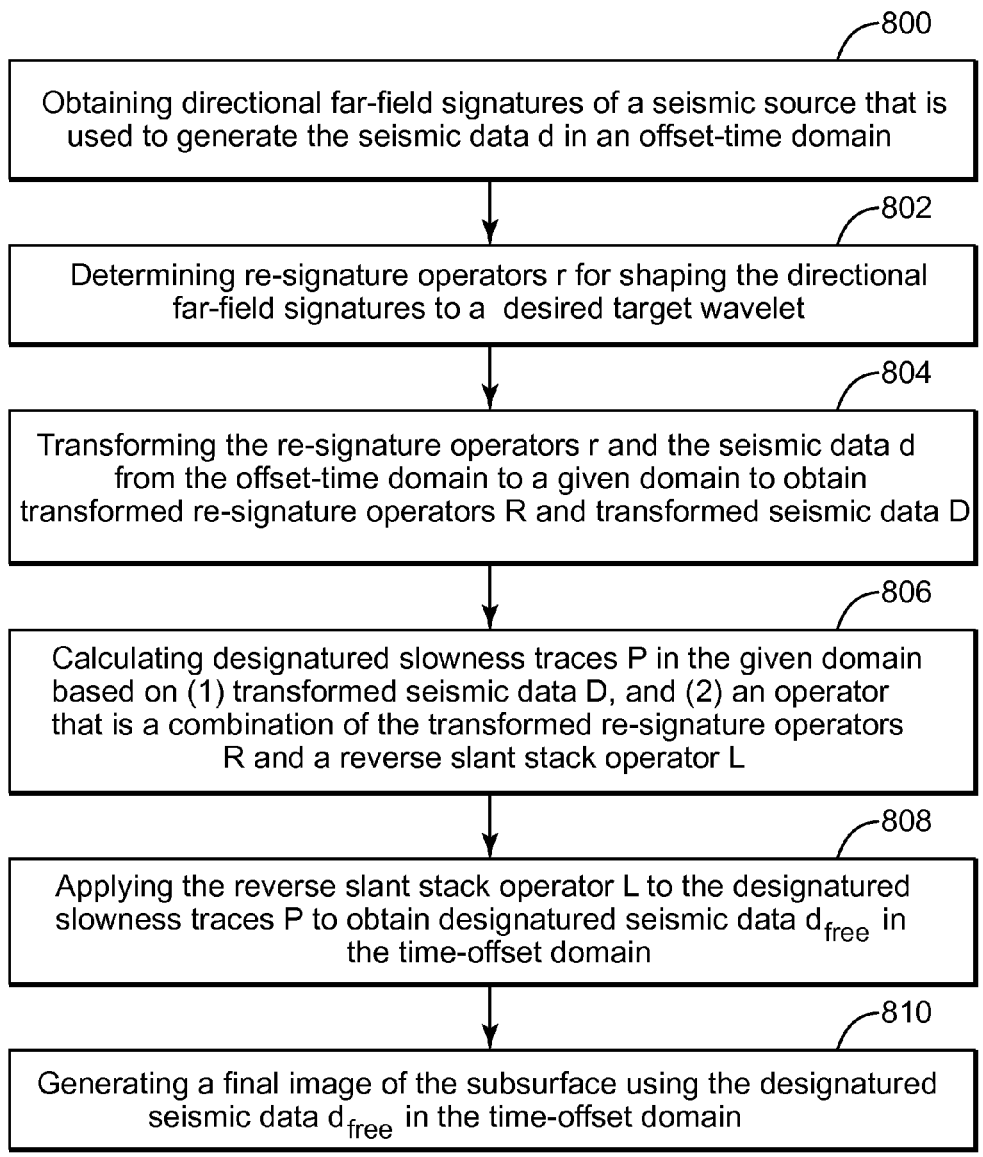
FIG. 8 is a flowchart illustrating a method for directional designature according to an embodiment.

To recapitulate, according to an embodiment illustrated in FIG. 8, there is a method for directional designature of seismic data d related to a subsurface of a body of water. The method includes a step 800 of obtaining directional far-field signatures of a seismic source that is used to generate the seismic data d in an offset-time domain; a step 802 of determining re-signature operators r for shaping the directional far-field signatures to a desired target wavelet; a step 804 of transforming the re-signature operators r and the seismic data d from the offset-time domain to a given domain to obtain transformed re-signature operators R and transformed seismic data D; a step 806 of calculating designatured slowness traces P in the given domain based on (1) transformed seismic data D, and (2) an operator that is a combination of the transformed re-signature operators R and a reverse slant stack operator L; a step 808 of applying the reverse slant stack operator L to the designatured slowness traces P to obtain designatured seismic data $d_{\text{free}}$ in the time-offset domain; and a step 810 of generating a final image of the subsurface using the designatured seismic data $d_{\text{free}}$ in the time-offset domain.

The above embodiments were discussed without specifying what types of seismic receivers are used to record the seismic data. In this sense, it is known in the art to use, for a marine seismic survey, streamers that are towed one or more vessels and the streamers include the seismic receivers. The streamers may be horizontal or slanted or having a curved profile as illustrated in FIG. 9.

Figure 9:
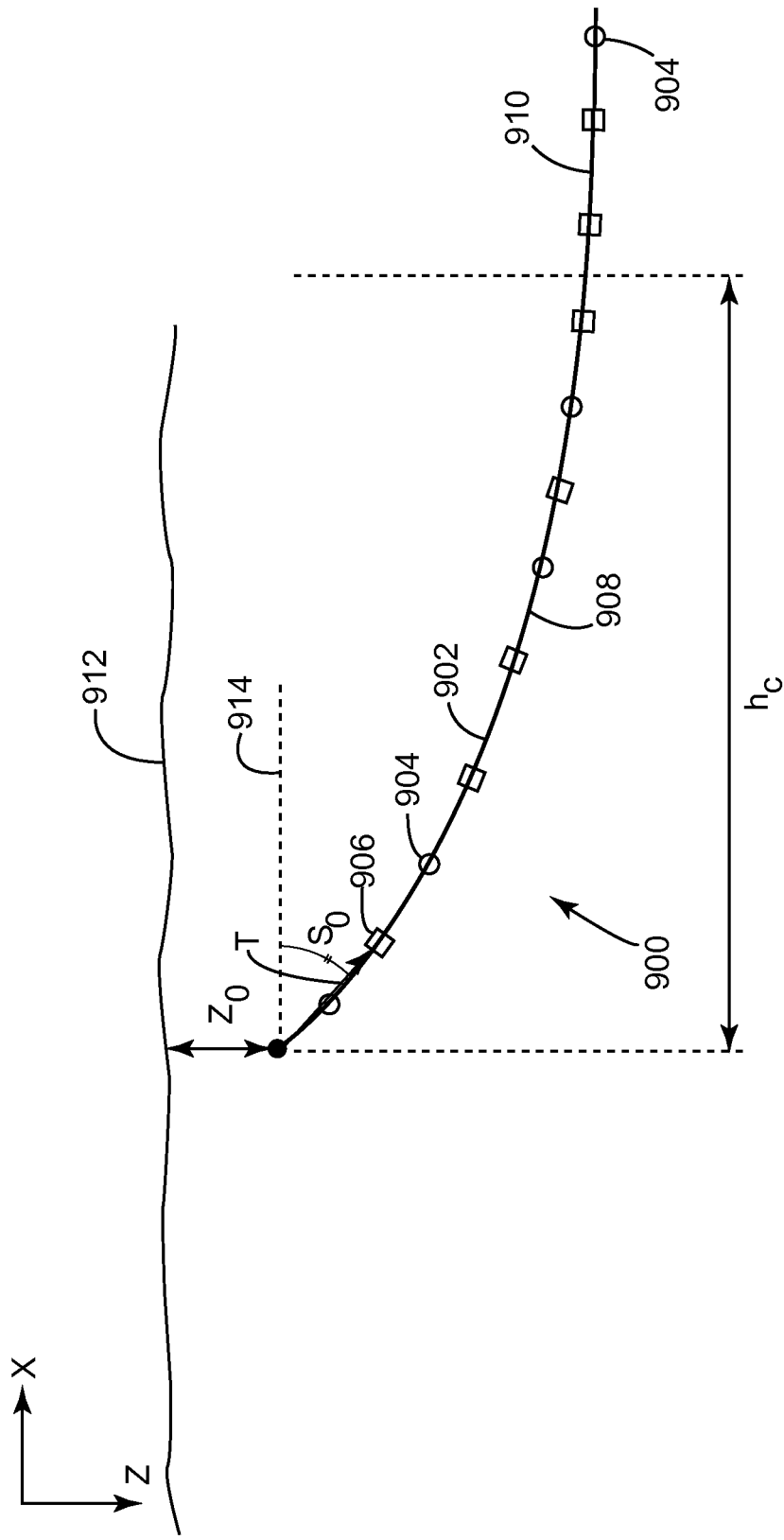
FIG. 9 is a schematic diagram of a curved streamer.

The curved streamer 900 of FIG. 9 includes a body 902 having a predetermined length; plural detectors 904 provided along the body; and plural birds 906 provided along the body for maintaining the selected curved profile. The streamer is configured to flow underwater when towed such that the plural detectors are distributed along the curved profile. The curved profile may be described by a parameterized curve, e.g., a curve described by (i) a depth $z_0$ of a first detector (measured from the water surface 912), (ii) a slope $s_0$ of a first portion T of the body with an axis 914 parallel with the water surface 912, and (iii) a predetermined horizontal distance $h_c$ between the first detector and an end of the curved profile. It is noted that not the entire streamer has to have the curved profile. In other words, the curved profile should not be construed to always apply to the entire length of the streamer. While this situation is possible, the curved profile may be applied only to a portion 908 of the streamer. In other words, the streamer may have (i) only a portion 908 having the curved profile or (ii) a portion 908 having the curved profile and a portion 910 having a flat profile, the two portions being attached to each other. The method may be used for pressure, velocity, particle motion, accelerometers, or other receivers designed to measure sound. The receivers may also be installed on the sea bed, or on land.

While the above embodiments relate to source designature of seismic data (applied in the receiver domain), the same approach can be extended to receiver directivity compensation (e.g., in the shot domain). This relates to receivers which have a different sensitivity to energy coming from different directions. This can be due to the receiver itself, or when a number of receivers are positioned and summed together in the field. This is termed a receiver group. In this case, the "re-signature operators" relate to the recording sensitivity of the receiver to energy coming in from different directions. A shot domain tau-p model free of receiver directivity effects is made so that when reverse tau-p transformed, and the receiver directivity effects are re-instated, equals the input data. Normally receiver sensitivity effects will be constant for the duration of the survey, but when receivers are replaced the sensitivity of the original and new recording equipment may have changed.

Figure 10:
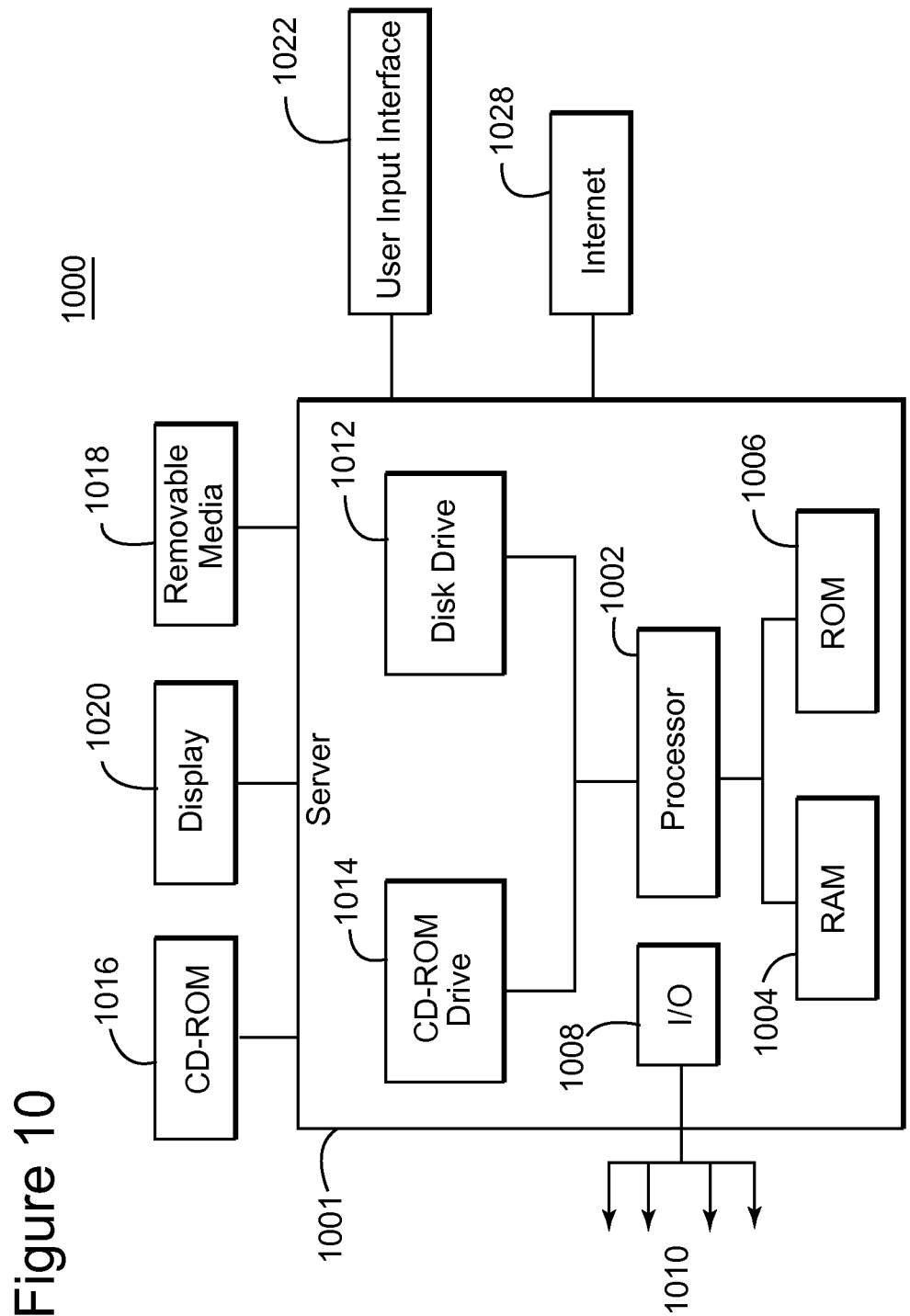
FIG. 10 is a schematic diagram of a computing device that can implement one or more of the methods noted above.

The above-discussed procedures and methods may be implemented in a computing device illustrated in FIG. 10. Hardware, firmware, software or a combination thereof may be used to perform the various steps and operations described herein. The computing device 1000 of FIG. 10 is an exemplary computing structure that may be used in connection with such a system.

The exemplary computing device 1000 suitable for performing the activities described in the exemplary embodiments may include a server 1001. Such a server 1001 may include a central processor (CPU) 1002 coupled to a random access memory (RAM) 1004 and to a read only memory (ROM) 1006. The ROM 1006 may also be other types of storage media to store programs, such as programmable ROM (PROM), erasable PROM (EPROM), etc. The processor 1002 may communicate with other internal and external components through input/output (I/O) circuitry 1008 and bussing 1010, to provide control signals and the like. The processor 1002 carries out a variety of functions as are known in the art, as dictated by software and/or firmware instructions.

The server 1001 may also include one or more data storage devices, including hard drives 1012, CDDROM drives 1014, and other hardware capable of reading and/or storing information such as DVD, etc. In one embodiment, software for carrying out the above-discussed steps may be stored and distributed on a CDDROM or DVD 1016, a USB storage device 1018 or other form of media capable of portably storing information. These storage media may be inserted into, and read by, devices such as the CDDROM drive 1014, the disk drive 1012, etc. The server 1001 may be coupled to a display 1020, which may be any type of known display or presentation screen, such as LCD displays, plasma display, cathode ray tubes (CRT), etc. A user input interface 1022 is provided, including one or more user interface mechanisms such as a mouse, keyboard, microphone, touchpad, touch screen, voice-recognition system, etc.

The server 1001 may be coupled to other devices, such as sources, detectors, etc. The server may be part of a larger network configuration as in a global area network (GAN) such as the Internet 1028, which allows ultimate connection to the various landline and/or mobile computing devices.

The disclosed exemplary embodiments provide a computing device and a method for seismic data designature. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for source directivity compensation of seismic data d with a given source directivity related to a subsurface, the method comprising:

obtaining directional operators r, wherein a directional operator converts a desired zero-phase wavelet to a source signature, for a given shot;

calculating with a computing device a model u with a modified source directivity based on (1) the seismic data d, and (2) an operator that is a combination of the directional operators r and a reverse transform operator L;

using the model u to obtain seismic data $d_{free}$ with modified source directivity; and generating an image of a geophysical structure in the subsurface using seismic data $d_{free}$.

2. The method of claim 1, wherein the step of calculating uses a model space substantially free of source directivity effects, and further comprises shaping a directivity of one source configuration to another source configuration, compensating for shot-to-shot variation in source directivity, and modifying a directivity to a new source depth, or other source directivity.

3. The method of claim 1, wherein a source includes elements on a horizontal datum or elements at different datums.

4. The method of claim 1, wherein the seismic data d is towed streamer data, ocean bottom data, land data, or a combination thereof.

5. The method of claim 1, wherein the seismic data d includes at least one of pressure, pressure gradient, velocity, acceleration, or other particle motion data.

6. The method of claim 1, wherein the seismic data d is narrow azimuth with source-receiver offset primarily in one direction or wide azimuth with source-receiver offset in more than one direction.

7. The method of claim 1, wherein the seismic data d is in the receiver domain, shot domain, CMP domain, common channel domain, cross-spread domain or a pre-stack domain.

8. The method of claim 1, wherein the seismic data d is in the time domain or a spectral domain.

9. The method of claim 1, wherein the directional operators r include at least one of a far-field signature, a re-signature operator, a notional source or a designature operator.

10. The method of claim 1, wherein the directional operators r are operators that describe or compensate for source variation with a takeoff direction or slowness.

11. The method of claim 1, wherein each directional operator r is an operator that describes or compensates for source variation with a takeoff direction or slowness and varies with a shot number or source configuration.

12. The method of claim 1, wherein the directional operators r are re-signature operators that shape a desired wavelet or wavelets to directional far-field signatures.

13. The method of claim 1, wherein the directional operators are calculated to avoid over-shaping through the use of additive noise.

14. The method of claim 1, further comprising:
calculating the model u in one of a tau-p domain, frequency-wavenumber (f-k) domain, parabolic Radon domain, hyperbolic Radon domain, curvelet domain, or other model domain.

15. The method of claim 1, wherein the calculating step further comprises:
solving equation:

$$\begin{pmatrix} D_1 \\ D_2 \\ D_n \end{pmatrix} = \begin{pmatrix} g_1 e^{-2\pi i f \tau_{1,1}} & g_2 e^{-2\pi i f \tau_{1,2}} & g_3 e^{-2\pi i f \tau_{1,3}} & g_m e^{-2\pi i f \tau_{1,m}} \\ g_1 e^{-2\pi i f \tau_{1,m}} & & & g_m e^{-2\pi i f \tau_{n,m}} \end{pmatrix} \begin{pmatrix} P_1 \\ P_2 \\ P_3 \\ P_m \end{pmatrix}$$

to calculate the slowness traces P,
wherein slowness traces P includes components $P_1$ to $P_m$, transformed seismic data D includes components $D_1$ to $D_n$, directional operators R include global operators $g_1$ to $g_m$, the reverse slant stack operator L includes components $e^{-2\pi i f \tau_{n,m}}$, where n is the number of shots and m is the number of slowness traces, and $\tau_{n,m}$ is a timeshift that depends on (1) an offset $x_n$ between the seismic source and a receiver recording the seismic data d, and (2) a slowness $s_m$ of a given trace.

16. The method of claim 1, wherein the calculating step further comprises:
solving equation:

$$\begin{pmatrix} D_1 \\ D_2 \\ D_n \end{pmatrix} = \begin{pmatrix} l(1,1)e^{-2\pi i f \tau_{1,1}} & l(1,2)e^{-2\pi i f \tau_{1,2}} & l(1,3)e^{-2\pi i f \tau_{1,3}} & l(1,m)e^{-2\pi i f \tau_{1,m}} \\ l(n,1)e^{-2\pi i f \tau_{n,1}} & & & l(n,m)e^{-2\pi i f \tau_{n,m}} \end{pmatrix} \begin{pmatrix} P_1 \\ P_2 \\ P_3 \\ P_m \end{pmatrix}$$

to calculate the slowness traces P,
wherein slowness traces P includes components $P_1$ to $P_m$, transformed seismic data D includes components $D_1$ to $D_n$, directional operators R include shot-by-shot directional re-signature local operators $l(i,j)$ with i varying from 1 to n and j varying from 1 to m, the reverse slant stack operator L includes components $e^{-2\pi i f \tau_{n,m}}$, where n is the number of shots and m is the number of slowness traces, and $\tau_{n,m}$ is a timeshift that depends on (1) an offset $x_n$ between the seismic source and a receiver recording the seismic data d, and (2) a slowness $s_m$ of a given trace, and
wherein the slowness traces P are free from shot-to-shot directional far-field signatures.

17. The method of claim 1, wherein an orientation of the source relative to the transform is accounted for in designing the directional operators r.

18. The method of claim 1, wherein the directional operators are derived using modeling, or field measurements.

19. A computing device for source directivity compensation of seismic data d with a given source directivity, related to a subsurface, the computing device comprising:
a processor configured to,
obtain directional operators r, wherein a directional operator converts a desired zero-phase wavelet to a source signature, for a given shot;
calculate a model u with a modified source directivity based on (1) seismic data d, and (2) an operator that is a combination of the directional operators r and a reverse transform operator L;
use the model u to obtain seismic data $d_{free}$ with modified source directivity; and
generate an image of a geophysical structure in the subsurface using seismic data $d_{free}$.

20. A non-transitory computer readable medium storing computer executable instructions, wherein the instructions, when executed by a computer, implement a method for source directivity compensation of seismic data d with a given source directivity, related to a subsurface, the method comprising:
obtaining directional operators r, wherein a directional operator converts a desired zero-phase wavelet to a source signature, for a given shot;
calculating a model u with a modified source directivity based on (1) seismic data d, and (2) an operator that is a combination of the directional operators r and a reverse transform operator L;
using the model u to obtain seismic data $d_{free}$ with modified source directivity; and
generating an image of a geophysical structure in the subsurface using seismic data $d_{free}$.

* * * * *